UNITED STATES PATENT OFFICE

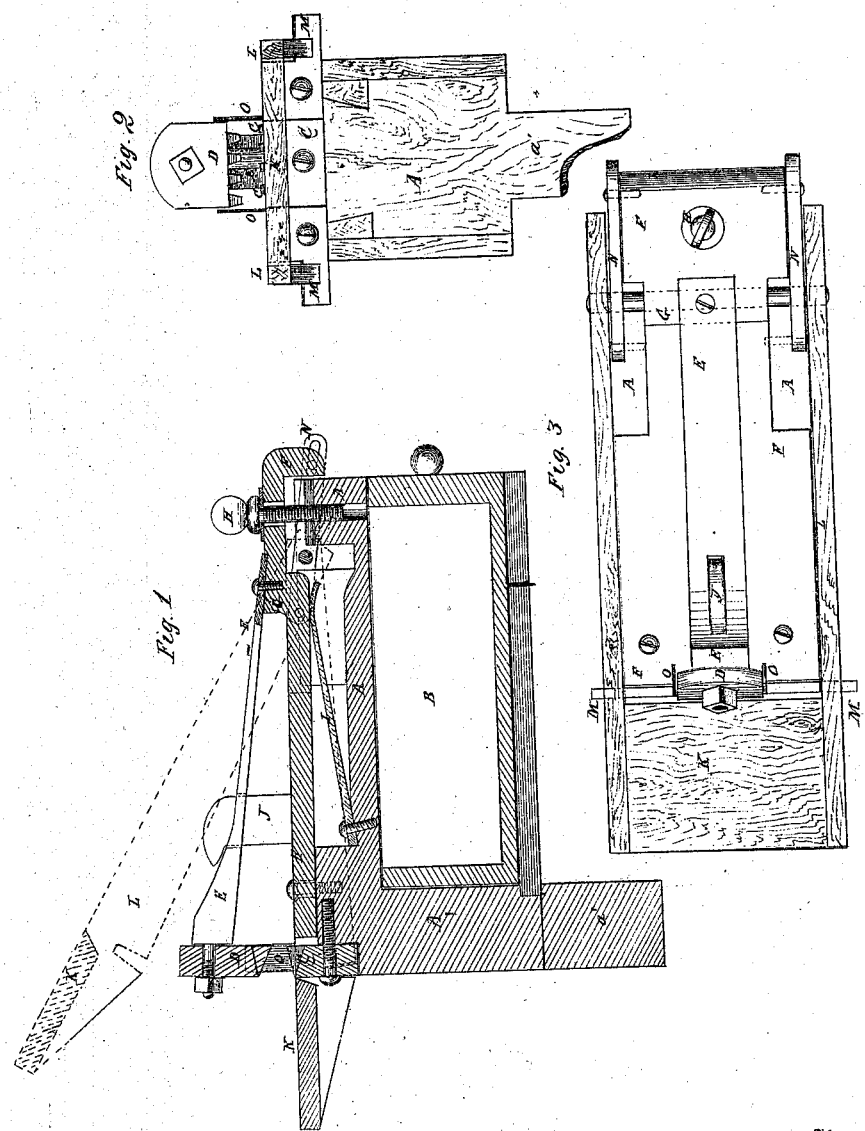

MORITZ THEODORE KLAHRE, OF BLOODY RUN, PENNSYLVANIA.

IMPROVEMENT IN SAW-SET.

Specification forming part of Letters Patent No. 104,467, dated June 21, 1870.

*To all whom it may concern:*

Be it known that I, MORITZ THEODORE KLAHRE, of Bloody Run, in the county of Bedford and State of Pennsylvania, have invented a new and useful Improvement in Saw-Set; and I do hereby declare that the following is a full, clear, and exact description thereof, which will enable others skilled in the art to make and use the same, reference being had to the accompanying drawing, forming part of this specification.

Figure 1 is a vertical longitudinal section of my improved saw-set. Fig. 2 is a front view of the same. Fig. 3 is a top view of the same.

Similar letters of reference indicate corresponding parts.

My invention has for its object to furnish an improved saw-set, by means of which a number of the teeth of a saw may be set upon both sides at the same operation, and which shall, at the same time, be simple in construction, effective in operation, and which may be easily adjusted to set the teeth more or less, or to set different-sized teeth, as may be required; and it consists in the construction and combination of the various parts of the machine, as hereinafter more fully described.

A is the frame of the machine, which is made with a square shank, a', upon the forward part of its lower side to enter a hole in the work-bench or other support. The frame A may be made in the form of a box, provided with a drawer, B, to receive the heads or dies.

C is the lower die or head, which is detachably attached to the upper part of the forward end of the frame A, and upon the face of which are formed teeth, as shown in Figs. 1 and 2, to bear against the alternate teeth of the saw and set them.

D is the upper die or head, which is detachably secured to the forward end of the spring E.

Upon the face of the die or head D are formed an equal number of teeth with the teeth of the die or head C, and arranged alternately with them.

The length of the dies or heads C D must depend upon the power to be applied to the machine, and the number of teeth in the two dies or heads must equal the number of teeth in a space of the saw to be set equal to the length of the said dies or heads.

The rear end of the spring E is secured by a screw to the rear part of the plate F, a block, G, being interposed between the said springs and plate, or a shoulder, B, being formed upon the plate F, to raise the said spring to a suitable height above the said plate.

The plate F is secured at its forward end to the forward part of the frame or box A by screws, so that its rear end may be lowered or raised, as more or less set is required to be given to the saw-teeth.

The rear end of the plate F is lowered and raised by means of the hand-screw H, which passes through the said plate F and screws into the frame or box A. The rear end of the plate F is held up against the collar-head or washer of the screw H by the spring I, placed in a recess in the frame or box A, and the free end of which presses against the under side of the rear end of the said plate F, as shown in Fig. 1.

The upward movement of the forward part of the spring E is limited by a shoulder formed upon the upper end of the standard J, which passes through a slot in the said spring, and the lower end of which is attached to the forward part of the plate F.

K is the platform, upon which the saw is laid to be set, which is attached to the forward ends of the bars L, which rest upon the stops M, attached to the forward end of the frame or box A, as shown in Figs. 2 and 3.

The bars L extend back along the sides of the frame or box A, and their rear ends are pivoted to the short bars N, the forward ends of which are pivoted to the frame or box A or to stationary supports attached to said frame or box.

The rear ends of the bars N are pivoted to the rear end of the plate F, the pivoting pins or screws passing through short slots in the said bars N, as shown in Fig. 1.

By this construction, as the rear end of the plate F is adjusted to regulate the set of the saw, the same movement also adjusts the position of the platform K, so that the plane of the saw-plate may always be midway between the inclination of the teeth of the dies or heads C D, to insure the saw-teeth having an equal set upon both sides of the saw.

O are stops, secured to the frame or box A at the ends of the die or head C, which enter the notches between the teeth of the saw at each side of the teeth being operated upon, and thus not only prevent the saw from being pushed too far inward, but also insure the teeth being in proper position to be operated upon.

When the machine is to be used for setting circular saws, the dies or heads C D should be made curved, according to the curve of the saw. When the machine has been adjusted to give the required set to the saw, and the saw-plate has been adjusted in place, a blow with a hammer is given to the upper end of the die or head D, said blow being given with sufficient force to give the required set to the teeth. If desired, the blow may be given by a drop-hammer or weight, working in ways attached to the frame or box A, and operated by a treadle and other levers.

Having thus described my invention, I claim as new and desire to secure by Letters Patent—

An improved saw-set consisting of the frame or box A, dies or heads C D, whether straight or curved, springs E, adjustable plate F, adjusting-screw H, spring I, platform K, bars L, stops M, pivoted bars N, and stops O, constructed and arranged in relation to each other, substantially as herein shown and described, and for the purpose set forth.

MORITZ THEODORE KLAHRE.

Witnesses:
THEODORE M. KLAHRE,
HERRMAN STEINBACH.